(No Model.)
W. P. BURKE.
BANANA CRATE.
No. 565,958. Patented Aug. 18, 1896.
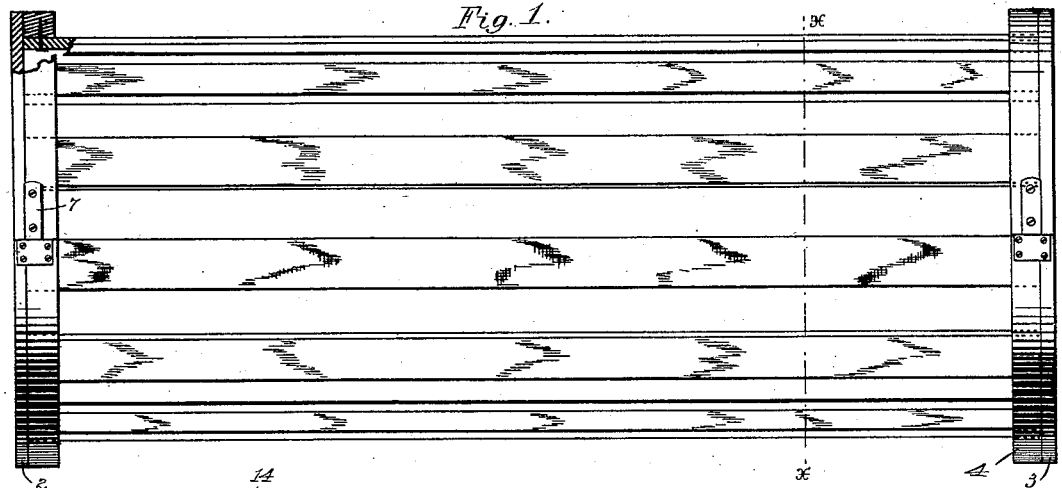
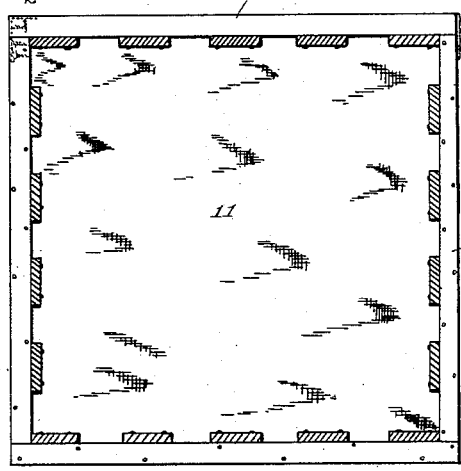
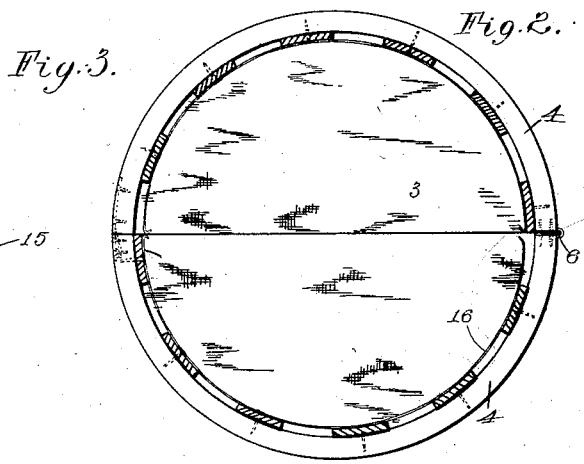
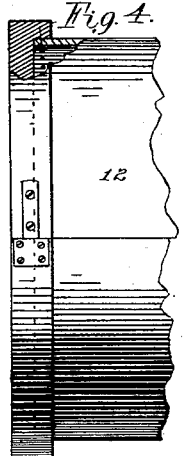 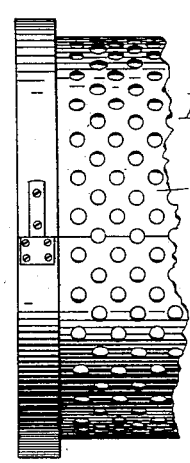 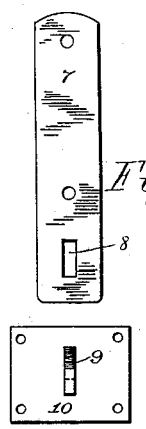 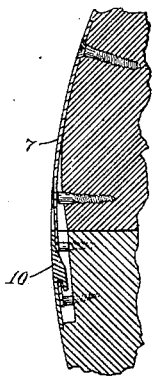
Witnesses:
F. Bradbury.
H. S. Johnson
Inventor:
Walter P. Burke.
per: T. D. Merwin
Attorney.

UNITED STATES PATENT OFFICE.

WALTER P. BURKE, OF ST. PAUL, MINNESOTA.

BANANA-CRATE.

SPECIFICATION forming part of Letters Patent No. 565,958, dated August 18, 1896.

Application filed January 30, 1895. Serial No. 536,626. (No model.)

*To all whom it may concern:*

Be it known that I, WALTER P. BURKE, of St. Paul, Ramsey county, Minnesota, have invented certain Improvements in Banana-Crates, of which the following is a specification.

My invention relates to improvements in fruit-crates, particularly those designed especially for the shipping of bananas, its object being to provide a device in which the fruit can be easily and quickly packed, and which will furnish an elastic cushion for the same, and hold it out of contact with the ground, and which cannot be opened or tampered with by unauthorized persons without breaking.

To this end my invention consists, essentially, in providing two solid, preferably circular, heads for the crate having a flange around the edge on the inner sides, and in securing a series of lath or other perforate side walls to the inside of said flanges, thus making a cylindrical package with the edges of the heads projecting beyond the side walls to serve as supports and protection for the same. The crate thus formed is preferably divided into two equal segments hinged together at one edge and having an automatic locking device for holding them closed.

My invention further consists in the specific construction and combination hereinafter particularly described and claimed.

In the accompanying drawings, forming part of this specification, Figure 1 is a side elevation of my improved crate, showing the general features of construction. Fig. 2 is a cross-section of the same, taken on line *x x* of Fig. 1. Fig. 3 is a detail of a modified construction, showing a rectangular instead of a cylindrical form of a crate. Fig 4 is a detail showing another modified construction in which the side walls are solid. Fig. 5 is a detail of another modified construction having its side walls formed of thin perforate material, and Figs. 6 and 7 are details of the locking device.

In the drawings, the heads 2 and 3 are formed preferably solid and circular, as shown in Figs. 1 and 2, and are provided with the flange 4 on their adjacent faces near the edge. To the inside of these flanges are nailed or otherwise secured the lath 5 with intermediate spaces, as shown in Figs. 1 and 2. The heads are divided into equal segments, as shown in Figs. 1 and 2, thus dividing the crate into halves, which are connected together at one edge by the hinges 6, so that the crate can be opened and both sections of it rest upon the ground in position to receive the fruit. The sections of the crate are locked together when closed by means of the spring-tongues 7, having holes or slots 8 therethrough attached to one section of the crate, adapted to engage the catches or spurs 9 upon the inner face of the plates 10, secured to the other section. It is evident that when the crate is closed and thus locked it is impossible to open it except by breaking it or removing the plates 10 from the crate, which cannot be done except by a screw-driver or other tool.

In the modified construction shown in Fig. 3 the head 11 is of rectangular form, the lid 14 being hinged to the body part 15, and adapted to be locked to it in the same manner as in the preferred construction above described.

In some cases it may be desirable to provide the crate with solid side walls 12, as shown in Fig. 4. In other cases it may be desirable to provide perforate side walls 13 of thin board or other suitable material, as shown in Fig. 5. The preferred construction, however, is that shown in Figs. 1 and 2, since the lath form an elastic support for the fruit, and if it is necessary to close the openings between this can be done by a lining of paper or other suitable material 16. (Shown in Fig. 2.)

In use the crate is opened with the two sections resting on the ground or other support. The hay or other cushioning material is then laid into the sections. The bunch of fruit is then placed in the bottom section, and the top closed over it and locked. The package can then be rolled or otherwise handled in the same manner as a barrel, and it cannot be opened or tampered with without breaking the locks, or breaking or displacing the lath in such manner as to reveal the fact of the unauthorized act, or by the detaching of the hinges of the locking devices. The lath cannot be detached because of the pressure against them of the inclosed fruit. The flanges on the heads raise the lath of the sides above the ground, when the crate is on its side, and also protect the lath from injury when the crate stands on end, by receiving the blows of boxes or other objects coming in contact with it.

When the package has reached its destination, the catch-plates of the locks are detached, so as to permit the crate to be opened, after which they can be again attached, and the crate is in condition for use a second time, or for other purposes.

I claim—

1. In combination with a crate of the class described, made up of two sections, and having a groove in the outside of one section, the plate provided with an inwardly-projecting catch placed over said groove, and the tongue secured to the other section, and adapted to pass into said groove underneath said plate, so as to be engaged and locked therein by the catch.

2. A locking device for packages of the class described, consisting of a plate upon one part carrying an inwardly-projecting inclined catch or spur, a slotted spring-tongue upon the other adapted to enter and spring downward into a groove beneath said catch so as to slip over the same, said groove being of such depth that the tongue cannot be depressed by pressure upon its exposed part so as to free it from the catch.

In testimony whereof I affix my signature in presence of two witnesses.

WALTER P. BURKE.

Witnesses:
T. D. MERWIN,
MINNIE THANWALD.